United States Patent
Daniel et al.

(10) Patent No.: US 11,146,589 B2
(45) Date of Patent: Oct. 12, 2021

(54) OUT-OF-BAND CHALLENGE IN A COMPUTER SYSTEM

(71) Applicant: British Telecommunications Public Limited Company, London (GB)

(72) Inventors: Joshua Daniel, London (GB); Gery Ducatel, London (GB)

(73) Assignee: British Telecommunications Public Limited Company, London (GB)

(*) Notice: Subject to any disclaimer, the term of this patent is extended or adjusted under 35 U.S.C. 154(b) by 166 days.

(21) Appl. No.: 16/498,880

(22) PCT Filed: Mar. 26, 2018

(86) PCT No.: PCT/EP2018/057686
§ 371 (c)(1),
(2) Date: Sep. 27, 2019

(87) PCT Pub. No.: WO2018/178035
PCT Pub. Date: Oct. 4, 2018

(65) Prior Publication Data
US 2020/0053082 A1    Feb. 13, 2020

(30) Foreign Application Priority Data
Mar. 30, 2017    (EP) .................................. 17164038

(51) Int. Cl.
*H04L 29/06*    (2006.01)
*H04W 12/065*    (2021.01)
*H04W 12/06*    (2021.01)

(52) U.S. Cl.
CPC .......... *H04L 63/18* (2013.01); *H04L 63/0892* (2013.01); *H04L 63/101* (2013.01);
(Continued)

(58) Field of Classification Search
CPC ... H04L 63/18; H04L 63/0892; H04L 63/101; H04L 63/102; H04W 12/068; H04W 12/065
(Continued)

(56) References Cited

U.S. PATENT DOCUMENTS

| 8,661,254 B1 | 2/2014 | Sama |
| 2006/0156385 A1* | 7/2006 | Chiviendacz ......... H04L 9/3271 726/2 |

(Continued)

FOREIGN PATENT DOCUMENTS

| EP | 1919123 | 5/2008 |
| WO | WO-2012117253 A1 | 9/2012 |

(Continued)

OTHER PUBLICATIONS

Great Britain Search Report, Application No. GB1705174.9, dated Jul. 14, 2017, 5 pages.

(Continued)

*Primary Examiner* — Longbit Chai
(74) *Attorney, Agent, or Firm* — Patterson Thuente Pedersen, P.A.

(57) ABSTRACT

A computer implemented method for access control for a consumer accessing a restricted resource in a network connected computer system, the method including receiving a continuous sequence of data records relating to use, by the consumer, of the restricted resource, the resource being accessed by the consumer over an access network; continuously comparing the data records with an access control policy for the restricted resource; in response to a determination that the behavior is non-compliant with respect to the policy, generating and communicating a shared secret to the consumer, the shared secret being communicated via a communications channel other than the access network;
(Continued)

receiving a response to a challenge from the user via the access network; and notifying the computer system that access to the resource by the consumer should be precluded based on a comparison of the response to the challenge and the shared-secret.

7 Claims, 2 Drawing Sheets

(52) U.S. Cl.
CPC ......... *H04L 63/102* (2013.01); *H04W 12/065* (2021.01); *H04W 12/068* (2021.01)

(58) Field of Classification Search
USPC .......................................................... 726/7
See application file for complete search history.

(56) References Cited

U.S. PATENT DOCUMENTS

| | | | |
|---|---|---|---|
| 2006/0282660 A1* | 12/2006 | Varghese | G06Q 20/4016 713/155 |
| 2011/0197070 A1 | 8/2011 | Mizrah | |
| 2014/0298011 A1 | 10/2014 | Ganesan | |
| 2014/0380444 A1 | 12/2014 | Kelley | |
| 2015/0082372 A1 | 3/2015 | Kottahachchi | |
| 2018/0285585 A1 | 10/2018 | Daniel | |

FOREIGN PATENT DOCUMENTS

| | | |
|---|---|---|
| WO | WO-2018178026 A1 | 10/2018 |
| WO | WO-2018178034 A1 | 10/2018 |
| WO | WO-2018228950 | 12/2018 |
| WO | WO-2018228951 | 12/2018 |
| WO | WO-2018228952 | 12/2018 |
| WO | WO-2018228973 | 12/2018 |
| WO | WO-2018228974 | 12/2018 |

OTHER PUBLICATIONS

International Search Report, Application No. PCT/EP2018/057686, dated Apr. 20, 2018, 3 pages.
International Preliminary Report on Patentability, Application No. PCT/EP2018/057686, dated Oct. 1, 2019, 7 pages.
Written Opinion, Application No. PCT/EP2018/057686, dated Oct. 4, 2018, 6 pages.
Aloul F., et al., "Two Factor Authentication Using Mobile Phones," May 2009, 5 pages.
International Preliminary Report on Patentability for Application No. PCT/EP2018/057686, dated Oct. 10, 2019, 8 pages.
Milton L., et al., N-Gram-Based User Behavioral Model for Continuous User Authentication, The Eighth International Conference on Emerging Security Information, Systems and Technologies, Nov. 16, 2014, 7 pages.

* cited by examiner

OUT-OF-BAND CHALLENGE IN A COMPUTER SYSTEM

CROSS-REFERENCE TO RELATED APPLICATIONS

The present application is a National Phase entry of PCT Application No. PCT/EP2018/057686, filed Mar. 26, 2018, which claims priority from European Patent Application No. 17164038.6 filed Mar. 30, 2017, each of which is fully incorporated herein by reference.

TECHNICAL FIELD

The present disclosure relates to access control for a computer system. In particular, it relates to the use of out-of-band challenges for access control.

BACKGROUND

Access control for computer systems, services and resources is based on a defined set of access rights for a user, consumer or class of user or consumer. Notably, users or consumers can include other computer systems, software components or automated entities that make use of, or consume, services and/or resources. These access rights can be constituted as access control rules for a user or class that must be defined to determine permitted and/or non-permitted actions by a user such as access to resources and/or services.

Defining access control rules requires considerable effort to ensure all aspects of access control and behavior management are considered. Thus, rules can be defined on a per-resource or service basis, a per-user or class basis, and per-permission or user/consumer right basis. The multi-dimensional considerations in defining these rules therefore present a considerable burden that it would be advantageous to mitigate.

Further, there is typically one or very few opportunities to authenticate a resource consumer for access control purposes. Frequently a consumer authenticates only as part of an access request or perhaps at fixed regular intervals. Further, where an access control policy stipulates constraints on how a resource is to be accessed and/or used by a consumer, additional burdens are placed on a computer system providing the resource to monitor such access/use or impose rigorous controls to prevent access/use other than that permitted by the policy.

SUMMARY

It would this be advantageous to provide access control mechanisms that address the aforementioned challenges.

The present disclosure accordingly provides, a computer implemented method for access control for a consumer accessing a restricted resource in a network connected computer system, the method comprising: receiving a continuous sequence of data records relating to use, by the consumer, of the restricted resource, the resource being accessed by the consumer over an access network; continuously comparing the data records with an access control policy for the restricted resource; in response to a determination that the behavior is non-compliant with respect to the policy, generating and communicating a shared secret to the consumer, the shared secret being communicated via a communications channel other than the access network; receiving a response to a challenge from the user via the access network; and notifying the computer system that access to the resource by the consumer should be precluded based on a comparison of the response to the challenge and the shared-secret.

In some embodiments the consumer authenticates with the computer system prior to accessing the restricted resource.

In some embodiments the continuous sequence of data records is received from the computer system and/or restricted resource.

In some embodiments the data records include log information recording operations performed by the computer system and/or resource as part of the use of the resource by the consumer.

In some embodiments the shared secret has an expiry time after which the shared secret ceases to be valid.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which.

DETAILED DESCRIPTION OF THE DRAWINGS

Figure 1:
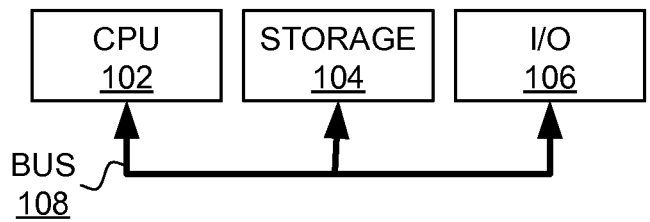
FIG. 1 is a block diagram of a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
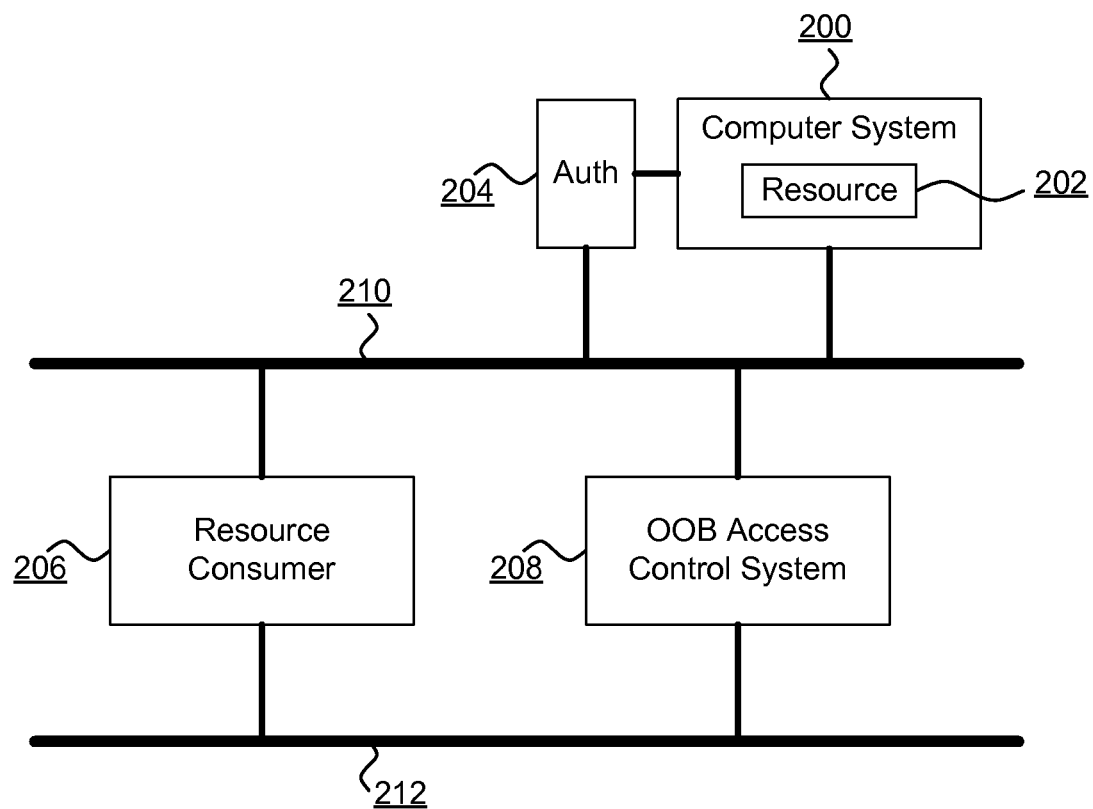
FIG. 2 is a component diagram of an arrangement in accordance with embodiments of the present disclosure.

FIG. 2 is a component diagram of an arrangement in accordance with embodiments of the present disclosure. A computer system 200 is provided as a physical, virtual or combination system having a restricted resource 202. The resource 202 can be a logical, physical, hardware, software, firmware or combination component whether real or virtualized to which access can be requested and of which use can be made by a resource consumer 206. The restricted resource 202 could conceivably include, inter alia: computing resource such as processor, storage, interface, network, peripheral, bus or other computing resource; a software resource such as an application, service, function, subroutine, operation or the like; a data store including a database, directory structure or directory, file store, memory or the like; or other resources as will be apparent to those skilled in the art.

The resource consumer 206 is a user or class of users seeking access to the computer system 200 and, in particular, the restricted resource 202. Thus, in use, the resource consumer 206 accesses the computer system 200 and consumes the resource 202.

The computer system 200 is communicatively connected to the resource consumer 206 via an access network 210 such as a wired or wireless computer network. The computer system 200 and/or the resource 202 optionally has associated an authentication component 204 for authentication of the resource consumer 206 such as by way of a user login and passphrase, biometric authentication or other suitable authentication means as will be apparent to those skilled in the art.

It will be appreciated that the computer system 200 can be a complete computer system such as illustrated in FIG. 1 or can be a part of a computer system 200 such as a software component or application executing on or with a computer system, a service provided at least in part by a computer system, or a network of multiple computer systems in communication.

The arrangement of FIG. 2 further includes an out-of-band (OOB) access control system 208 as a hardware, software, firmware or combination component that can be real or virtualized. The OOB access control system 208 is communicatively connected to the computer system 200 hosting the restricted resource 202 via, for example, the access network 210. Additionally, the OOB access control system 208 is communicatively connected to the resource consumer 206 via a second network 212 such as a wired or wireless computer network offering a second communication channel other than the access network 210. The second network 212 is not connected to the access network 210 directly.

The OOB access control system 208 includes, has associated, accesses or receives an access policy defining one or more rules for permitting access to the restricted resource 202. Such rules can include rules relating to the consumer 206, including an identity of the consumer, the computer system 200 and/or the resource 202 including the nature of access and use of the resource 202 such as behaviors of the consumer in using the resource 202.

In use the resource consumer 206 optionally authenticates with the authenticator 204 in order to gain access to the resource 202 via the restricted network. The computer system 200 is further configured to communicate information to the OOB access control system 208 relating to the use, by the consumer, of the resource 202. For example, a usage monitoring component (not shown) can be configured to monitor the computer system 200 during use of and/or access to the restricted resource 202 by the consumer. The usage monitoring component can monitor consumption of the resource 202, one or more states of the resource 202, operations performed by, on or to the resource 202, and the like, while the resource 202 is used by the consumer 206. To illustrate, if the resource 202 is a storage resource such as a virtual disk store, the usage monitoring component can observe, note, or receive information on the operation of the computer system 200 including read operations, write operations, an amount of data stored, data content, times of operations, frequencies of operations, an identity of the consumer 206 requesting, invoking or making the operations, and other such usage information as will be apparent to those skilled in the art. For example, such a usage monitoring component can be installed on the computer system 200, or in communication with the computer system 200 such that it is able to monitor the computer system 200 and the use of or access to the restricted resource 202 such as by way of operating system or configuration interfaces or services.

The OOB access control system 208 receives a continuous sequence of data records from the computer system 200 and/or resource 202 (such as via a monitoring component) relating to use, by the consumer, of the restricted resource 202 while the resource is accessed via the access network 210. The receipt of the data records is continuous in that the records are received for substantially the entire period of access to the resource 202 by the consumer 206. In one embodiment, data records are communicated to the OOB access control system 208 periodically such as every second or every 15 seconds. Alternatively, data records can be communicated as they are generated, or they can be batched for communication at lower frequencies such as every minute or every 5 minutes. The OOB access control system 208 applies the access policy to the data records as they are received to identify any data records indicating a deviation from the access policy by the consumer 206 using the restricted resource 202. Thus, the OOB access control system 208 is checking the policy continuously in the same way that the records are received continuously. Where a deviation is detected the OOB access control system 208 invokes an OOB authentication mechanism.

In one exemplary embodiment the OOB authentication mechanism involves the generation of a (preferably short-lived, such as expiring after a few seconds such as 5 or 10 seconds) secret to be shared with the resource consumer 206 by communication to the resource consumer 206 via the second network 212 that is out-of-band with respect to the access network 210. In some embodiments, during the OOB authentication mechanism, access to the restricted resource 202 by the consumer 206 is precluded (such as by being suspended) until the OOB authentication mechanism is concluded successfully (i.e. until authentication is successful). Thus, in some embodiments the OOB access control system 208 communicates with the computer system 200 and/or resource 202 to effect such preclusion of access by the consumer 206 during the OOB authentication mechanism.

In addition to communicating the shared secret to the consumer 206 via the out-of-band second network 212, the computer system 200 and/or authentication component 204 generates a challenge for the consumer 206, a correct response to which is based on, derived from or equal to the shared secret. The challenge is communicated to the consumer 206 via the access network (or any suitable network other than the out-of-band second network 212). The consumer 206 responds to the challenge and the authentication component 204 and/or computer system 200 communicate the response to the OOB access control system.

It will be appreciated by those skilled in the art that communication of the shared secret to the consumer 206 can occur by way of a communication of means to generate the shared secret by the consumer. Such means can include a hardware device or a secure software application communicated to the consumer 206 via the out-of-band second network 212 and configured to generate a secret consistent with a secret also accessible to the OOB access control system 208 such that the secret is shared. In some embodiments, such shared secret generators are configured to generate short-lived secrets that expire and are replaced at regular intervals.

On receipt of the challenge response the OOB access control system 208 determines if the challenge response is as expected (i.e. is based on, derived from or equal to the shared secret, as required). Where the challenge response is not as expected then authentication of the consumer 206 fails and authorization to use the resource 202 ends. Where the challenge response is as expected then the OOB access control system 208 reverts to continuously receiving data records from the computer system 200 and/or resource 202 to detect any subsequent deviation from the access policy and repeat the OOB authentication process as required.

Thus, embodiments of the present disclosure provide for a continual monitoring of access and use of a controlled resource 202 by a consumer 206 and the detection of deviations from an access policy as they occur. Deviations trigger the OOB authentication process so providing a rigorous and reliable authentication of the consumer 206. Accordingly, the access policy is defined for and applied by the OOB access control system 208 and the computer system 200 and resource 202 provide data records reflecting the access and use of the resource 202 constituting the behavior of the consumer 206 for checking on a continuous basis.

Figure 3:
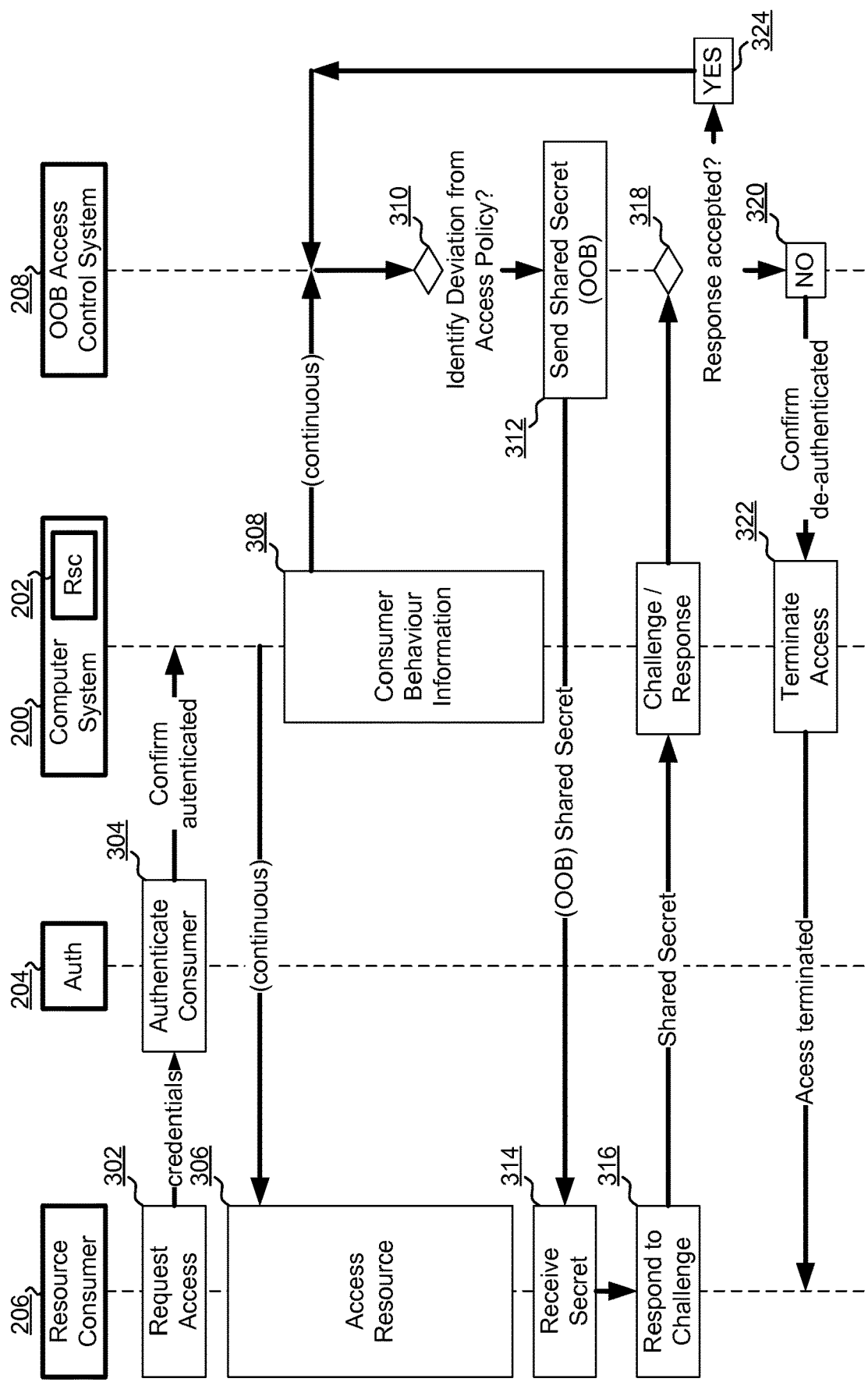
FIG. 3 is a flow diagram illustrating a method for access control for a consumer accessing a restricted resource in a network connected computer system in accordance with embodiments of the present disclosure.

FIG. 3 is a flow diagram illustrating a method for access control for a consumer 206 accessing a restricted resource 202 in a network connected computer system 200 in accordance with embodiments of the present disclosure. Initially, at 302, the consumer requests access to the restricted resource supplying credentials for authentication by an authentication component 204. At 304 the authentication component 204 authenticates the consumer 206 and informs the computer system 200 and/or resource 202 of successful authentication. Notably, 302 and 304 are optional and authentication could alternatively be left to the continuous authentication process provided by the OOB access control system 208. Further alternatively, the authentication mechanism described could be replaced with an OOB authentication mechanism on a request for access to the resource 202.

Subsequently, at 306, the consumer 206 accesses and/or uses the restricted resource 202 continuously as required via the access network 210. Meanwhile, at 308, the computer system 200, resource 202 and/or a monitoring component associated therewith generates and communicates data records to the OOB access control system 208, the records relating to the use of the resource 202 by the consumer 206. The records are communicated continuously to the OOB access control system as previously described.

At 310, the OOB access control system 208 analyses the data records to identify a deviation from an access policy of the OOB access control system 208. Where a deviation is detected the OOB access control system 208 implements an OOB authentication process from 312. At 312 a shared secret is communicated OOB via the out-of-bound second network 212 to the consumer 206. In some embodiments, the shared secret has an expiry time after which the shared secret ceases to be valid as a basis for any response to a challenge based on the shared secret. The OOB access control system further informs the computer system 200, resource 202 and/or authentication component 204, any or all of which implement a challenge/response process by communicating a challenge to the consumer 206 via the access network 210.

The consumer receives the shared secret at 314 and addresses the challenge at 316 by communicating a response to the challenge via the access network 210. The response is communicated to the OOB access control system which determines, at 318, if the response is acceptable. The response is acceptable if it is in accordance with the shared secret. If the response is determined to be acceptable at 324 the OOB access control system 208 returns to the continuous receipt of data records and checking for deviations from the access policy at 310. If the response is determined to be unacceptable at 320 the OOB access control system 208 communicates with one or more of the authentication component 204, the computer system 200 and/or the resource 202 to effect a termination of access to the resource 202 by the consumer 206.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for access control for a consumer accessing a restricted resource in a computer system connected to an access network, the method comprising:
   receiving a continuous sequence of data records while the consumer is accessing and using the restricted resource over the access network;
   continuously comparing the received data records with an access control policy for the restricted resource, wherein the access control policy is accessed or received and applied by an out-of-band (OOB) access control system to identify any deviation from the access policy by the consumer using the restricted resource;

in response to a determination that a behavior of the consumer is non-compliant with respect to the access control policy, generating and communicating a shared secret to the consumer, the shared secret being communicated via an OOB communications channel other than the access network;

receiving and validating, by the OOB access control system, a response to a challenge corresponding to the shared secret from the consumer via the access network; and notifying the computer system that access to the restricted resource by the consumer should be precluded based on the validation of the response to the challenge and the shared secret.

2. A non-transitory computer-readable storage medium storing a computer program element comprising computer program code to, when loaded into a computer system and executed thereon, cause the computer system to perform the method as claimed in claim 1.

3. The method of claim 1, wherein the consumer authenticates with the computer system prior to accessing the restricted resource.

4. The method of claim 1, wherein the continuous sequence of data records are received from at least one of the computer system or the restricted resource.

5. The method of claim 1, wherein the data records include log information recording operations performed by at least one of the computer system or the restricted resource as part of the use of the restricted resource by the consumer.

6. The method of claim 1, wherein the shared secret has an expiry time after which the shared secret ceases to be valid.

7. A computer system for access control for a consumer accessing a restricted resource comprising:

a processor device and memory storing computer program code for access control for the consumer accessing the restricted resource in the computer system connected to an access network;

receiving a continuous sequence of data records while the consumer is accessing and using the restricted resource over the access network;

continuously comparing the received data records with an access control policy for the restricted resource, wherein the access control policy is accessed or received and applied by an out-of-band (OOB) access control system to identify any deviation from the access policy by the consumer using the restricted resource;

in response to a determination that a behavior of the consumer is non-compliant with respect to the access control policy, generating and communicating a shared secret to the consumer, the shared secret being communicated via an OOB communications channel other than the access network;

receiving and validating, by the OOB access control system, a response to a challenge corresponding to the shared secret from the consumer via the access network; and notifying the computer system that access to the restricted resource by the consumer should be precluded based on the validation of the response to the challenge and the shared secret.

* * * * *

UNITED STATES PATENT AND TRADEMARK OFFICE
CERTIFICATE OF CORRECTION

| | |
|---|---|
| PATENT NO. | : 11,146,589 B2 |
| APPLICATION NO. | : 16/498880 |
| DATED | : October 12, 2021 |
| INVENTOR(S) | : Daniel et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 196 days.

Signed and Sealed this
Thirteenth Day of December, 2022

*Katherine Kelly Vidal*

Katherine Kelly Vidal
*Director of the United States Patent and Trademark Office*